United States Patent [19]

Bish et al.

[11] Patent Number: 5,526,329
[45] Date of Patent: Jun. 11, 1996

[54] CALIBRATION OF READBACK THRESHOLD IN AN OPTICAL STORAGE DEVICE TO DETERMINE A BLANK SECTOR

[75] Inventors: John E. Bish, Tucson, Ariz.; David E. Call, Hollister, Calif.; Glen A. Jaquette, Tuscon, Ariz.; Judson A. McDowell, Tuscon, Ariz.; Arturo A. Mojica, Tucson, Ariz.; Lawrence D. Tipton, Tucson, Ariz.

[73] Assignee: International Business Machines Corporation, Armonk, N.Y.

[21] Appl. No.: 381,617

[22] Filed: Jan. 30, 1995

Related U.S. Application Data

[62] Division of Ser. No. 197,525, Feb. 16, 1994, Pat. No. 5,430,702.

[51] Int. Cl.⁶ .................................................. G11B 7/00
[52] U.S. Cl. .................. 369/32; 369/48; 369/58; 369/116
[58] Field of Search .................... 369/32, 54, 58, 369/48, 47, 44.32, 44.25, 44.26, 44.28, 44.29, 116; 360/46, 59

[56] References Cited

U.S. PATENT DOCUMENTS 5,070,495  12/1991  Bletscher, Jr. et al. ............... 369/116
5,113,384   5/1992  McDonald et al. ..................... 369/54
5,136,569   8/1992  Fennema et al. ....................... 369/54
5,185,733   2/1993  Finkelstein et al. .................... 369/54
5,251,194  10/1993  Yashimoto et al. ..................... 369/50
5,341,360   8/1994  Johann et al. ........................ 369/116

*Primary Examiner*—Nabil Z. Hindi
*Attorney, Agent, or Firm*—D. A. Shifrin

[57] ABSTRACT

The present invention provides a method and an apparatus to accurately and consistently distinguish blank sectors from written sectors on optical media despite drive and media variations. A readback envelope threshold is established each time optical media is mounted into an optical drive. In one embodiment, the gain of readback amplifiers are set to a first level, the optical head seeks to and reads a sector or set of sectors on the optical disk known to have information recorded thereon and a first readback envelope generated. The gain of the readback preamplifier is then set to a second level, the optical head seeks to and reads another sector or set of sectors known to have information recorded thereon and a second readback envelope generated. The readback threshold is calculated from the amplitudes of the first and second envelopes. Once the threshold has been calculated for a disk, the drive can scan for a blank sector by comparing the amplitude of the sector's readback envelope with the threshold: if the amplitude is less than the threshold, and no other written format feature is readily indicated the sector can be classified as being blank and it is safe to write to the sector.

5 Claims, 4 Drawing Sheets

CALIBRATION OF READBACK THRESHOLD IN AN OPTICAL STORAGE DEVICE TO DETERMINE A BLANK SECTOR

This Application is a divisional of application Ser. No. 8/197,525, filed Feb. 16, 1994, now U.S. Pat. No. 5,430,702.

TECHNICAL FIELD OF THE INVENTION

The present invention relates to optical storage devices, and in particular, to a method and apparatus for calibrating a readback threshold to enhance detection of blank sectors on optical media.

BACKGROUND OF THE INVENTION

When recording information to optical media, such as write once or rewritable optical disks, it is important to detect whether a particular sector has already been recorded. For example, a host device to which an optical drive is attached can issue a command to locate the next available blank sector to start a write operation. If an error occurs in locating this sector, a blank sector can remain unwritten or a written sector with previously written information can be inadvertently overwritten and the previously written information lost. Moreover, even if the overwritten sector did not contain valuable customer data, the overwrite can make it difficult for the drive's servo to track through the overwritten sector and make it difficult or impossible to read the remaining sectors on the track. Similarly, the drive may be required to locate blank sectors as part of data recovery procedures. It will be appreciated that serious data integrity problems can occur when written and blank sectors cannot be reliably distinguished.

With re-writable optical media, such as magneto-optical (MO), one or more directories are kept on the media identifying the sectors which have been recorded. However, if a sector becomes unreadable, it is necessary to verify its status other than through the directory. With write once media, such as write once read many (WORM), directories are not kept on the media due to the amount of space required. Therefore, another method of determining whether a sector is written is necessary.

Prior to the present invention, one of a number of possible parameters was measured while reading the data area of a sector and compared to a fixed value in order to determine whether the sector was written. Such a procedure can be inconsistent and unreliable, however, due to factors which can vary from drive to drive and from disk to disk. These factors include, for example, drive to drive electronic variations (as from heat, age and component variations within a tolerance range), media to media amplitude variations, optical path variations (including variations caused by dust and other debris on optical elements), different read power levels suggested by different media manufacturers, and variations in media reflectivity. More specifically, it will be appreciated that the readback amplitude on a population of drives and media will vary greatly. Media variation alone can cause variation as great as 10:1 in a multi-function drive which detects ablative, phase change, and magneto-optic disks. Drive tolerances can add another 2:1. Because of this, the readback amplitude at a given fixed gain level will vary wildly. A setting which is insufficient to read ID's on one drive media combination may cause the next to saturate. For this reason, the threshold calibration routine must be adaptive to the degree that it allows modification of the channel gain settings and re-calibration of the envelope threshold if the gain setting present is inadequate for either processing ID's or sufficient resolution to set the threshold.

SUMMARY OF THE INVENTION

In view of the foregoing, it is an object of the present invention to accurately and consistently distinguish blank sectors from written sectors on optical media despite drive and media variations.

This object and others are achieved in this invention by establishing a new readback envelope threshold each time optical media is mounted into a drive. The readback amplitude envelope of a blank sector will be near some fixed value determined by circuit offsets. Written sectors will have a higher readback amplitude envelope depending upon the readback channel gain (which must be held fixed, e.g. Automatic Gain Control cannot be allowed to operate) and media characteristics, but also upon the data pattern written (e.g. a 3T (..100100100..) pattern will give a lower readback amplitude in general than a lower frequency tone or pseudo-random data). Moreover, a sector must be reliably detected as written or blank independent of the contents of that sector. For this reason, it is required that a dependable envelope threshold be determined which is above that seen for a blank sector and below what would be seen for any data pattern. To place the threshold reliably in this range, at least two and preferably more points must be gathered to allow calculation of a robust threshold. Measurement of the approximate blank sector amplitude can be made before the laser has acquired focus. This is the blank baseline. Also, sectors known to be written with data, containing low frequency run length codes can be measured at a known fixed readback gain level to give an indication of the readback amplitude envelope of a written sector. Intermediate points can be gathered by reading same sectors at lower readback gain levels such as ½ if the fixed gain of the channel is adjustable. The measurement of any two of these three points would allow calculation of an envelope threshold. The measurement of all three points would allow a linear curve fit for more repeatable and reliable threshold placement.

Additionally, selection of sectors known to be written is of issue. For instance, when a WORM disk is loaded, it cannot be assumed that any sectors are written by the drive. If the disk definition structure (DDS) is written, this is the best place to calculate the envelope threshold. If no DDS's can be read, they cannot automatically be assumed to be blank, they must be scanned. If it is truly a virgin disk, then no data sectors written by a drive are present. In this case, it is required that the scan threshold be calibrated upon some sectors such as the standard formatted part (SFP) track which is known to be pre-embossed (the readback amplitude of an embossed track should approximate that of a written sector in ablative WORM).

In one embodiment of the present invention, the gain of a read channel is fixed and set to a first level, the optical head seeks to and reads a sector or set of sectors on the optical disk known to have recorded information thereon and a first readback envelope generated. The gain of the read channel is then fixed and set to a second level, the optical head seeks to and reads another sector or set of sectors known to have recorded information thereon and a second readback envelope generated. The read channel threshold is calculated from the amplitudes of the first and second envelopes. For gains such as X and 2X where the sector to be scanned will be read at 2X gain, a preferable equation is: $(3L-H)/2$, where L is the readback amplitude of the envelopes generated when the preamplifier gain is at the lower of the two settings and H is the readback amplitude of the envelopes generated when the preamplifier gain is at the higher setting.

After calibration of the readback threshold for a particular disk, a scan to find an available blank sector includes setting the read channel gain to a fixed level, attempting to read information from the sector thought to be blank and obtaining a readback envelope. The amplitude of the readback envelope is then compared with the threshold and, if the amplitude is less than the threshold, the sector is considered blank. If desired, other indications can be recorded to confirm the status of a sector thought to be blank on the same read pass. This includes detection of a flag field, VFO field, synch mark or resynch mark.

Consequently, drive to drive and media to media variations in read channel amplitudes are substantially neutralized and disadvantages of a fixed, factory set threshold substantially eliminated.

The foregoing and other features and advantages of the invention will be apparent from the following more particular description of preferred embodiments of the invention, as illustrated in the accompanying drawings.

DETAILED DESCRIPTION OF THE INVENTION

Figure 1:
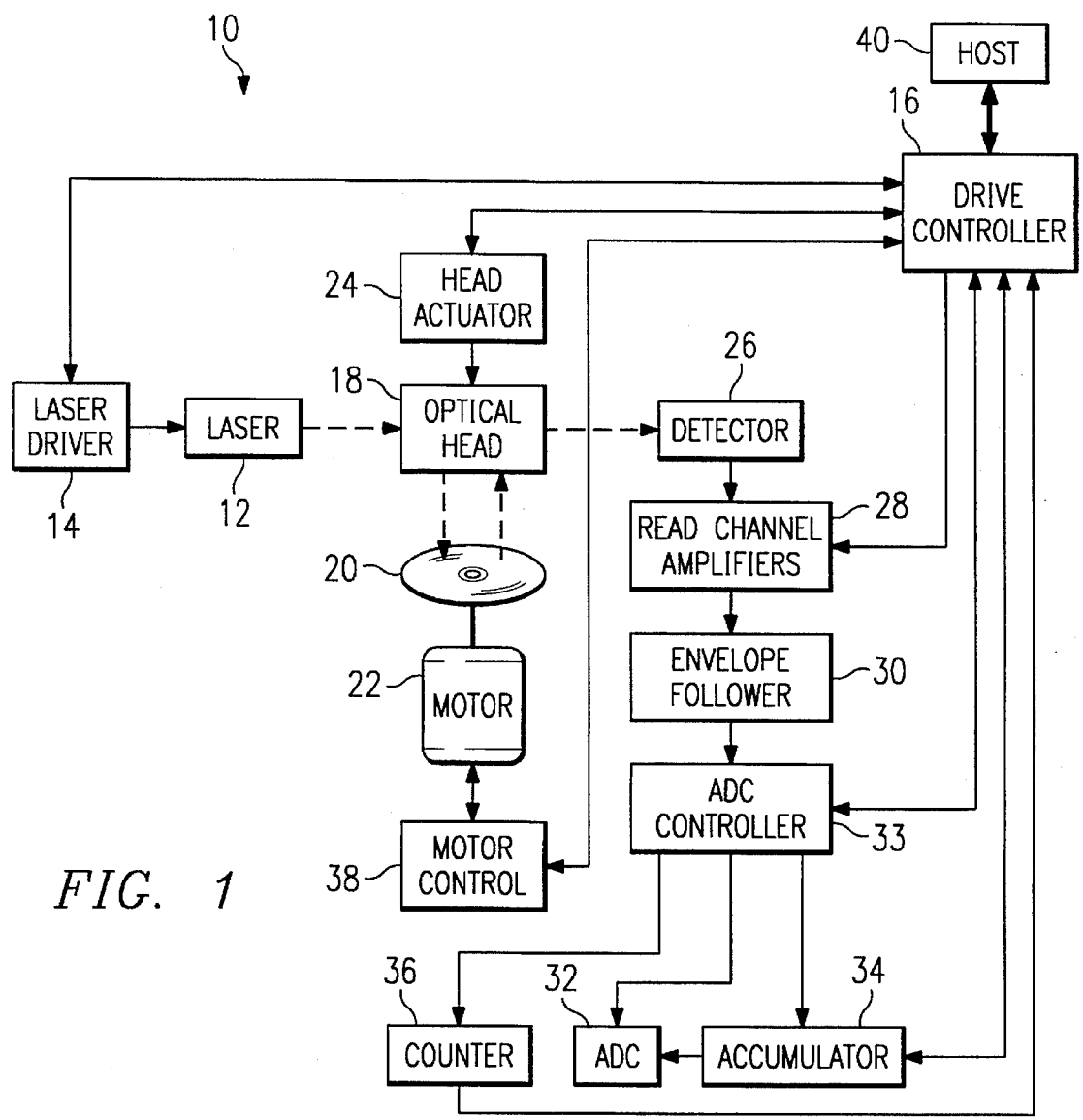
FIG. 1 is a block diagram of an optical recording device employing an embodiment of the present invention.
Figure 2:
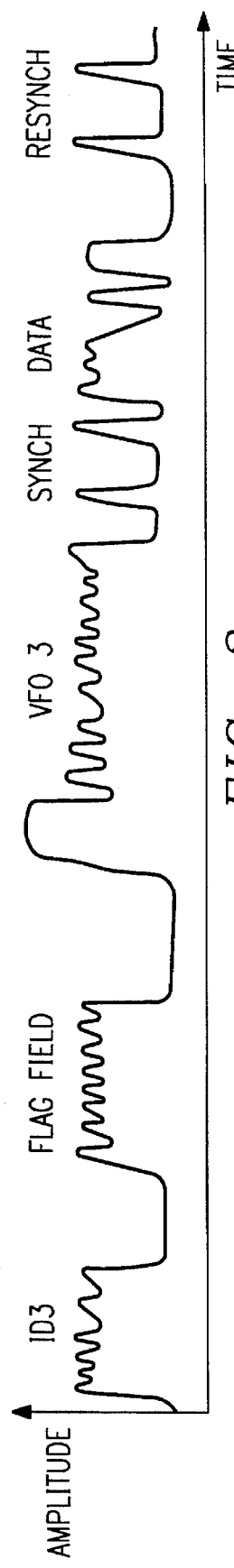
FIG. 2 is a plot of an exemplary analog readback signal.

FIG. 1 is a block diagram of an optical recording device or drive 10 employing an embodiment of the present invention. The drive 10 includes a light source, such as a laser 12, modulated by a laser controller 14 which, in turn, is controlled by a drive controller 16. An optical head 18 directs the laser beam onto a surface of optical media, such as an optical disk 20, mounted to a motor 22. The optical head 18 is under mechanical control by a head actuator 24 to maintain the position of the laser beam in the radial direction and to maintain its focus on the surface of the disk 20. Light which is reflected off of the disk 20 is directed by the optical head 18 onto a detector (or set of detectors) 26. The detector 26 generates an analog signal representative of information recorded on the disk 20, as illustrated by the plot in FIG. 2. FIG. 2 represents the amplitude of the analog signal during the readback of an exemplary sector, including, in order, a portion of the ID field, the flag field, a VFO field, a synch mark, customer data and resynch marks.

Figure 4:
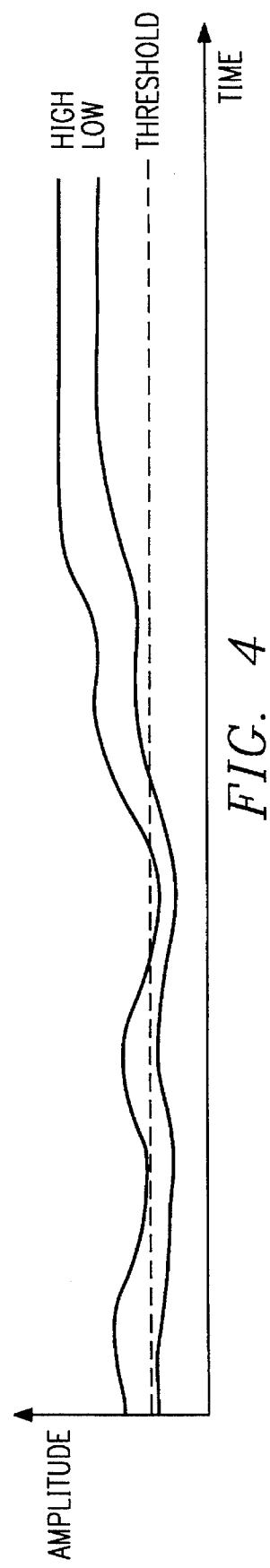
FIG. 4 is a plot of an exemplary readback envelope showing the level at which the readback threshold is set.

The detector 26 transmits the analog signal to read channel amplifiers 28 and then to an envelope follower 30. The envelope follower 30 generates an envelope signal, as illustrated in FIG. 4, which is digitized by an analog to digital converter (ADC) 32. The ADC 32 is interconnected to the envelope follower 30 through an ADC controller 33 which an accumulator 34 and a counter 36 are also interconnected.

In addition to being interconnected with the laser driver 14, the drive controller 16 is interconnected with, and controls, the head actuator 24, a motor controller 38, the read channel amplifiers 28, and the ADC controller 33 and the accumulator 34; the drive controller 16 also is interconnected to receive the output of the counter 36.

Figure 3:
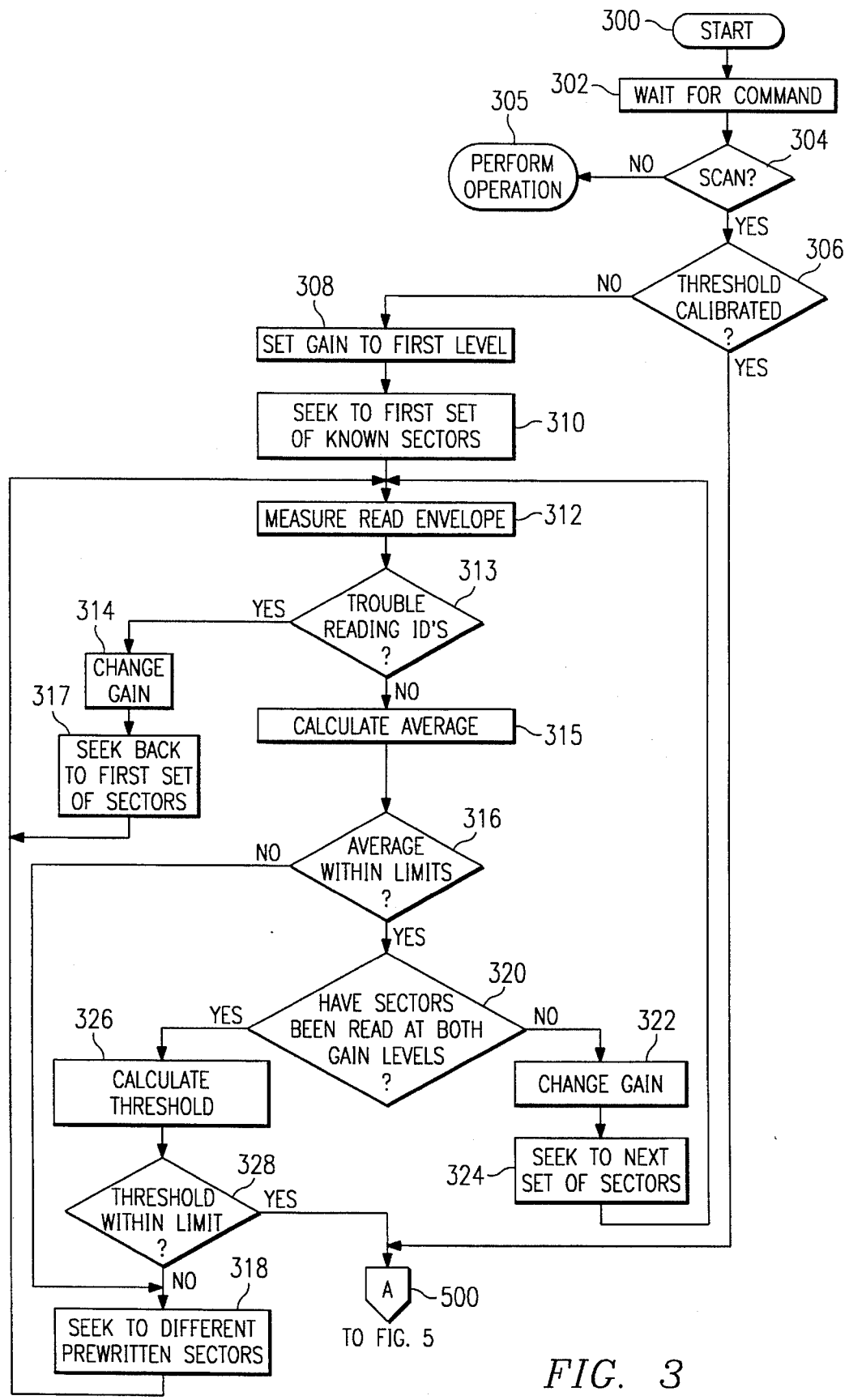
FIG. 3 is a flowchart of an embodiment of the threshold calibration method of the present invention.

The operation of an embodiment of the present invention will now be described with reference to the flow chart of FIG. 3. After the optical disk 20 is mounted in the drive 10, the drive controller 16 waits for a command (Step 302) from a host device 40 to which the drive is interconnected. When the command is received, the drive controller 16 determines whether the operation requested requires a scan operation (Step 304), such as to locate the next available blank sector in preparation for a write operation. If not, the operation is performed (Step 305). It is noted that the amplitude threshold is not necessarily calibrated each time a disk is mounted. However, the description herein applies when calibration is to be performed.

Due to drive to drive electronic variations, media to media amplitude variations, drive optical path variation, media reflectivity variations and differing read power levels recommended by media manufacturers, each drive, disk combination is different. Variations may even be apparent on the same disk between the inner diameter (ID) and the outer diameter (OD). Some of the foregoing variations may change over time. Therefore, if the host command requests a scan, a determination is made (Step 306) whether the readback amplitude threshold has already been calculated for the disk 20 mounted this particular time in the drive 10. If so, the routine advances to Step 500.

If not, the threshold calibration process is initiated. The gain of the read channel 28 is fixed at a first level by the drive controller 16 (Step 308). Preferably, the first level is a low or moderate gain level, such as 4 (where 8 is the gain normally used during data envelope measurement operations). Next, the drive controller 16 directs the head actuator 24 to cause the head 18 to seek to a predetermined sector, or block of sectors, known to have information recorded thereon (Step 310). (In a common variation of the Steps 308 and 310, a seek is made to sectors before the first set of sectors. At the end of the seek, the beam lands on a sector and the ID is read. The beam then spirals in toward the first set of sectors as the disk rotates and the gain is changed to the first level. The read envelope can then be read in Step 312.) If the media is rewritable (such as magneto-optical) media, the drive controller 16 can direct a seek to the disk definition structure (DDS) area of the disk. If the media is write once (WORM) media, the drive controller 16 can direct a seek to the standard formatted part (SFP) area, which is embossed by the manufacturer of the media, or to the DDS area. Other areas can also be used if it is reliably known that data is present in those areas.

Once the head 18 is in the desired position and the laser beam properly focussed and tracking, the envelope follower 30 generates a readback envelope (Step 312) while tracking over the data field of the targeted sector(s). For greater accuracy, the envelope is preferably measured many times across the targeted sector(s). The individual measurements can be summed by the accumulator 34, with a count being kept by the counter 36. If sector ID's cannot be accurately read (Step 313), the gain is changed (Step 314), a seek is made back to the first set of sectors (Step 317) and another attempt made. The accumulated value and the count are sent to the drive controller 16 and the average of the envelope amplitudes is calculated (Step 315). A check is made to determine whether the average is within predefined limits (Step 316); if not, the drive controller 16 directs a seek to a different set of prewritten sectors (Step 318). If the average is within the predefined limits, and the sectors have been read at only one gain level (Step 320), the channel amplifier gain is changed (Step 322), preferably to the normal envelope measurement setting, and the drive controller 16 directs a seek to another prewritten sector (or set of prewritten sectors) (Step 324). (The variation of Steps 308 and 310 discussed above is equally applicable to Steps 322 and 324.) The second set of sectors can be located immediately following the first set (or with one or more transition sectors in between), can be the same set of sectors read on the next disk revolution, or can be sectors elsewhere on the disk.

Once the head 18 is again in the desired position and the laser beam properly focussed and tracking, the envelope follower 30 generates a second readback envelope (Step 312) and a second average is calculated (Step 315). A check is made to determine whether this average is within the predefined limits (Step 316). If so, and the sectors have been read at both gain levels (Step 320), the threshold is calculated (Step 326). Although the threshold can be calculated based upon the envelope amplitude from a single prewritten sector read at a single preamplifier gain setting, it is preferable to obtain an average envelope amplitude from several sectors at one gain setting and repeat the process with at least one other gain setting and then calculate the threshold.

It will be appreciated that the readback threshold level should not be set so high that there is not an adequate margin of safety between the threshold and the envelope amplitude expected when a written sector is readback. Similarly, the threshold should not be set so low that there is not an adequate margin of safety between the threshold and the envelope amplitude expected when a blank sector is readback. Otherwise, written sectors may be classified as blank or blank sectors classified as written. FIG. 4 is a plot of the amplitudes of two readback envelopes, the higher curve representing the readback at a higher gain setting and the lower curve representing the readback at a lower gain setting. A blank sector should ideally have an envelope with an amplitude close to a predetermined fixed value. It has been found that a satisfactory distinction can be made between written and blank sectors when the readback threshold level is calculated according to the equation: $(3L-H)/2$, where L and H are the envelope readback amplitudes when the prewritten sectors are read at the low and high gains, respectively, related by 1:2. Such a level is indicated in FIG. 4 by the dashed line. Other equations can be used instead. For example, if an envelope amplitude is obtained from a prewritten sector (or sectors) at only a single gain setting, the threshold can be a predetermined percentage of the envelope amplitude. Alternatively, if L and H are equal to X and 2X, respectively, a linear curve fit method, relying on L, H and a baseline B, can be used to calculate a threshold equal to $(3L-H)/2$, thereby increasing the allowance for gain tolerances between L and H.

After being calculated at Step 326, the threshold is checked to ensure that it is within a prescribed range (Step 328). If not, the entire process is repeated with a different set of prewritten sectors (Steps 318, 312, etc.). If the threshold level is satisfactory, the original operation requested by the host 40 is carried out (Step 500).

Figure 6A:
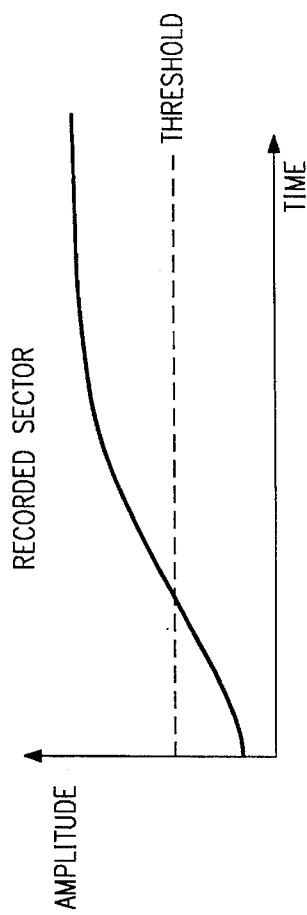
FIGS. 6A and 6B are plots of readback envelopes, relative to the readback envelope threshold, of recorded and blank sectors, respectively.
Figure 6B:
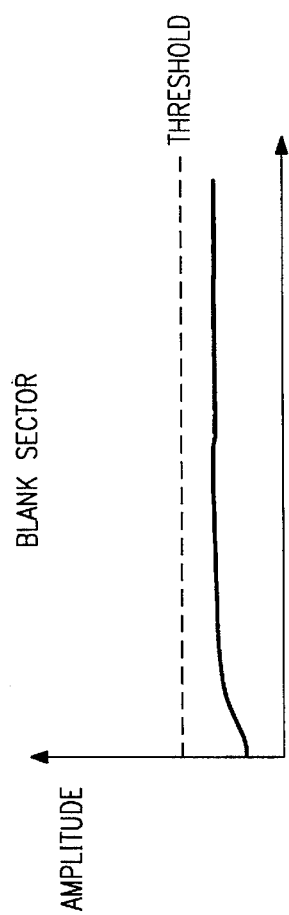
Figure 5:
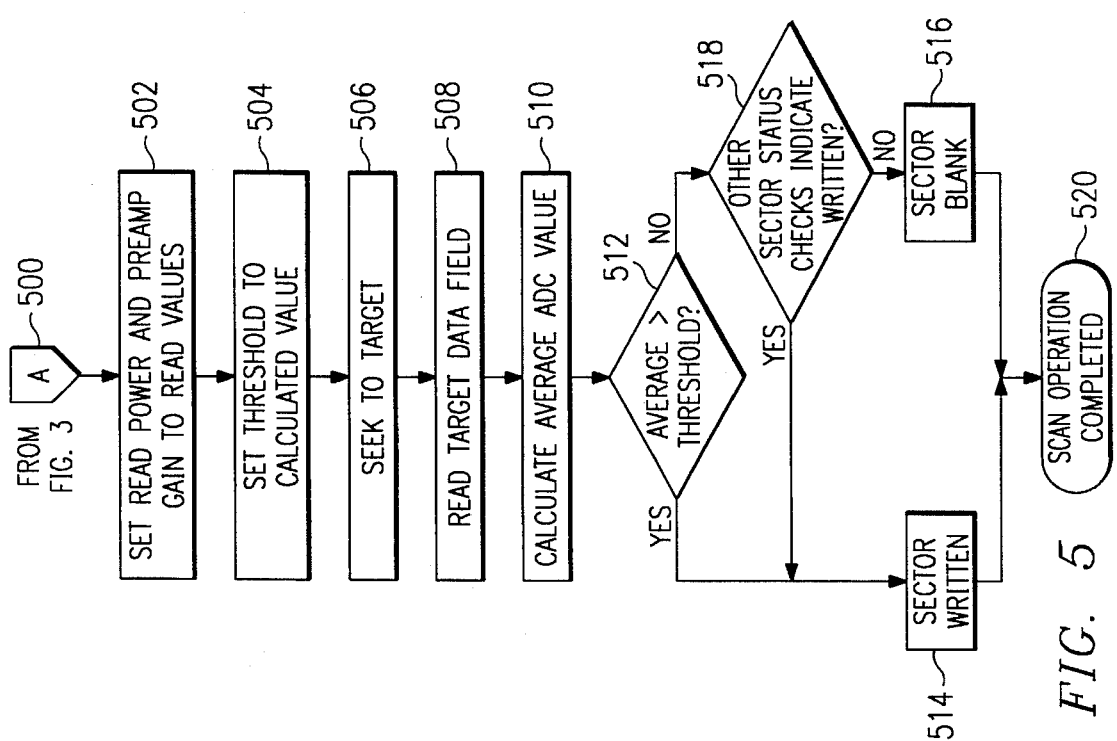
FIG. 5 is a flow chart of an embodiment of the sector seek method of the present invention.

Referring to the flow chart of FIG. 5, a scan for a blank sector will now be described. The drive controller 16 sets the power of the laser 12 and the gain of the preamplifier 28 to appropriate read levels (if either was changed after the threshold calculation process) (Step 502) and verifies that the readback threshold is set to the calculated value (Step 504). The head 18 then seeks to the target sector (Step 506) and, when the laser beam is properly focused and tracking, the data field of the target sector is read (Step 508). In a manner similar to that employed during threshold calibration, the amplitude of the readback envelope of the target sector is measured (Step 510) and compared with the threshold (Step 512). If, as illustrated in FIG. 6A, the amplitude exceeds the threshold, the sector is classified as written (Step 514) and the scan operation is complete (Step 520). (FIG.'s. 6A or 6B are drawn to an expanded scale relative to FIG. 4.) On the other hand, if, as illustrated in FIG. 6B, the amplitude is less than the threshold, a check of other sector status indicators is made (Step 518); these can indicate that the sector is written (Step 514) or blank (Step 516). In either event, the scan operation is complete (Step 520).

While the invention has been particularly shown and described with reference to preferred embodiments thereof, it will be understood by those skilled in the art that various changes in form and details may be made therein without departing from the spirit and scope of the invention. Moreover, it will be appreciated that the flowcharts of FIGS. 3 and 5 are illustrative only and do not include certain housekeeping details, such as exiting from a loop and entering an error recovery routine if conditions are not met after a specified number of passes through the loop.

What is claimed is:

1. A method of calibrating a readback threshold for an optical storage disk, comprising the steps of:

mounting an optical disk in an optical storage drive;

seeking to a first predetermined sector known to have information written thereon;

setting a preamplifier gain to a first level;

reading the information from the first predetermined sector and obtaining a first data envelope having a first readback amplitude;

setting the preamplifier gain to a second level;

seeking to a second predetermined sector known to have information written thereon;

reading the information from the second predetermined sector and obtaining a second data envelope having a second readback amplitude; and calculating a readback threshold from the first readback amplitude and the second readback amplitude.

2. The method of claim 1, wherein said calculating step comprises the step of calculating the readback threshold from the first and second readback amplitudes.

3. The method of claim 2, wherein:

the first and second predetermined sectors are a first plurality and a second plurality of consecutive sectors, respectively;

said step of obtaining the first data envelope comprises the step of obtaining a data envelope from each of the first plurality of sectors and averaging their readback amplitudes; and said step of obtaining the second data envelope comprises the step of obtaining a data envelope from each of the second plurality of sectors and averaging their readback amplitudes.

4. The method of claim 3, wherein:

the first level of the preamplifier gain is a low level;

the second level of the preamplifier gain is a high level; and said calculating step comprises the step of calculating the readback threshold according to the equation: (3L-H)/2, where L and H are the first and second readback amplitudes, respectively.

5. A method of calibrating a readback threshold for an optical storage disk, comprising the steps of:

mounting an optical disk in an optical storage drive;

seeking to a first predetermined sector known to have information written thereon;

reading the information from the first predetermined sector and obtaining a first data envelope having a first readback amplitude;

calculating a readback threshold from the first readback amplitude;

determining whether the calculated readback threshold is within an acceptable range of readback thresholds; and if the calculated readback threshold is not within the acceptable range of readback thresholds:

seeking to a second predetermined sector known to have information written thereon;

reading the information from the second predetermined sector and obtaining a second data envelope having a second readback amplitude; and calculating a second readback threshold from the second readback amplitude and the first readback amplitude.

* * * * *